US008627437B2

(12) United States Patent
Dietrich et al.

(10) Patent No.: US 8,627,437 B2
(45) Date of Patent: *Jan. 7, 2014

(54) METHOD FOR READING ATTRIBUTES FROM AN ID TOKEN

(75) Inventors: Frank Dietrich, Berlin (DE); Manfred Paeschke, Wandlitz (DE)

(73) Assignee: Bundesdruckerei GmbH, Berlin (DE)

( * ) Notice: Subject to any disclaimer, the term of this patent is extended or adjusted under 35 U.S.C. 154(b) by 60 days.

This patent is subject to a terminal disclaimer.

(21) Appl. No.: 13/003,339

(22) PCT Filed: May 11, 2009

(86) PCT No.: PCT/EP2009/055666
§ 371 (c)(1),
(2), (4) Date: Mar. 23, 2011

(87) PCT Pub. No.: WO2010/006822
PCT Pub. Date: Jan. 21, 2010

(65) Prior Publication Data
US 2011/0296512 A1    Dec. 1, 2011

(30) Foreign Application Priority Data

Jul. 15, 2008 (DE) .......................... 10 2008 040 416

(51) Int. Cl.
*G06F 21/00* (2013.01)
(52) U.S. Cl.
USPC ............... 726/9; 713/168; 713/175; 713/171; 705/67; 705/65; 709/228; 455/420; 380/247
(58) Field of Classification Search
USPC .................... 726/4, 9; 713/168; 709/225, 228
See application file for complete search history.

(56) References Cited

U.S. PATENT DOCUMENTS 5,825,875 A * 10/1998 Ugon ............................. 705/65
5,918,228 A *  6/1999 Rich et al. ......................... 1/1

(Continued)

FOREIGN PATENT DOCUMENTS

| DE | 102008000067.1 A1 | 7/2009 | |
| WO | 9722092 A2 | 6/1997 | |
| WO | WO 01/06468 A1 * | 1/2001 | ................. G07F 7/10 |

OTHER PUBLICATIONS

Ty Mey Eap et al., Enabling User Control with Personal Identity Management, International Conference on Services Computing 60-67 (Jul. 2007).*

(Continued)

*Primary Examiner* — Morshed Mehedi
*Assistant Examiner* — Sharon Lynch
(74) *Attorney, Agent, or Firm* — Matthew B. Dernier, Esq.; Gibson & Dernier LLP

(57) ABSTRACT

The invention relates to a method for reading at least one attribute stored in an ID token, wherein, where the ID token is associated with a user, having the following steps: the user is authenticated to the ID token, a first computer system is authenticated to the ID token, following successful authentication of the user and the first computer system to the ID token, the first computer system effects read access to the at least one attribute stored in the ID token in order to transmit the at least one attribute, when it has been signed, to a second computer system, where the authentication of the first computer system to the ID token is performed because of an attribute specification, which is received by the first computer system from a third computer system.

13 Claims, 6 Drawing Sheets

(56) References Cited

U.S. PATENT DOCUMENTS

| | | | |
|---|---|---|---|
| 6,173,400 B1* | 1/2001 | Perlman et al. | 713/172 |
| 6,442,532 B1* | 8/2002 | Kawan | 705/36 R |
| 7,178,025 B2* | 2/2007 | Scheidt et al. | 713/168 |
| 8,387,108 B1* | 2/2013 | Satish et al. | 726/1 |
| 2001/0027527 A1* | 10/2001 | Khidekel et al. | 713/201 |
| 2001/0045451 A1 | 11/2001 | Tan et al. | |
| 2002/0097159 A1* | 7/2002 | Hooglander | 340/573.1 |
| 2003/0115267 A1 | 6/2003 | Hinton et al. | |
| 2004/0034774 A1* | 2/2004 | Le Saint | 713/169 |
| 2004/0128383 A1* | 7/2004 | Hinton | 709/225 |
| 2004/0128390 A1* | 7/2004 | Blakley et al. | 709/228 |
| 2004/0139028 A1* | 7/2004 | Fishman et al. | 705/67 |
| 2005/0138421 A1* | 6/2005 | Fedronic et al. | 713/201 |
| 2005/0235148 A1* | 10/2005 | Scheidt et al. | 713/168 |
| 2006/0005263 A1* | 1/2006 | Hardt | 726/28 |
| 2006/0294583 A1* | 12/2006 | Cowburn et al. | 726/10 |
| 2007/0132548 A1* | 6/2007 | Baraz et al. | 340/5.6 |
| 2007/0208940 A1* | 9/2007 | Adelman et al. | 713/168 |
| 2007/0282881 A1* | 12/2007 | Relyea | 707/101 |
| 2007/0283424 A1* | 12/2007 | Kinser et al. | 726/5 |
| 2007/0294431 A1 | 12/2007 | Adelman | |
| 2008/0005566 A1* | 1/2008 | Morita | 713/171 |
| 2008/0120511 A1* | 5/2008 | Naguib | 713/194 |
| 2008/0184339 A1* | 7/2008 | Shewchuk et al. | 726/3 |
| 2008/0229402 A1* | 9/2008 | Smetters et al. | 726/9 |
| 2008/0229411 A1* | 9/2008 | Norman et al. | 726/20 |
| 2009/0198618 A1* | 8/2009 | Chan et al. | 705/66 |
| 2009/0292927 A1* | 11/2009 | Wenzel et al. | 713/185 |
| 2010/0064136 A1* | 3/2010 | Longobardi et al. | 713/168 |
| 2011/0023103 A1* | 1/2011 | Dietrich et al. | 726/9 |
| 2011/0264916 A1* | 10/2011 | Fischer et al. | 713/175 |
| 2011/0296512 A1* | 12/2011 | Dietrich et al. | 726/9 |
| 2012/0023559 A1* | 1/2012 | Dietrich et al. | 726/6 |
| 2012/0167186 A1* | 6/2012 | Dietrich | 726/6 |
| 2012/0174193 A1* | 7/2012 | Dietrich | 726/4 |

OTHER PUBLICATIONS

Zhikui Chen, A privacy Enabled Service Authorization Based on a User-centric Virtual Identity Management System, Second International Conference on Communications and Networking in China 423-427 (Aug. 2007).*

Md. Faruk Hossain Mazumder et al., Windows Cardspace, Information Security Course Project, Dept of Computer and Information Science, Linkoping Univ., Linkoping, Sweden, (2007), available athttp://www.ida.liu.se/~TDDC03/oldprojects/2007/projects/14.pdf.*

C. Kolias et al., Enhancing User Privacy in Adapative Web Sites with Client-Side User Profiles, Third International Workshop on Semantic Media Adaptation and Personalization 170-176 (2008).*

US 8,296,819 B1, 10/2012, Satish et al. (withdrawn).*

Science and Technology Information Center Search Stragey report including terms searched and list of patents (Apr. 14, 2013).*

International Search Report for corresponding PCT Application No. PCT/EP2009/055666, Sep. 8, 2009.

International Preliminary Report on Patentability and Written Opinion for corresponding PCT Application No. PCT/EP2009/055666, Feb. 1, 2011.

Microsoft Corporation "An Implementer's Guide to the Identity Selector Interoperability Profile V1.0" p. 1-74, Version 1.0, Apr. 2007.

Gerrit Hornung, The Digital Identity. Legal Problems of Chip Card Identifications: Digital Personal Identification, Electronic Health Insurance Card, JobCard Processes. "Electronic Legal Relations" series, edited by Prof. Dr. Alexander Roβnagel in collaboration with TeleTrusT Deutschland e.V., vol. 10, pp. 1, 5-8, 220-224, 318-328, 339, 368-373, 440., (2005).

* cited by examiner

METHOD FOR READING ATTRIBUTES FROM AN ID TOKEN

BACKGROUND

The invention relates to a method for reading at least one attribute from an ID token, to a computer program product, to an ID token and to a computer system.

The prior art discloses various methods for managing what is known as the digital identity of a user:

Microsoft Windows CardSpace is a client-based digital identity system which is intended to allow Internet users to communicate their digital identity to online services. One drawback in this context, inter alia, is that the user can manipulate his digital identity.

By contrast, OPENID is a server-based system. What is known as an identity server stores a database with the digital identities of the registered users. One drawback of this, inter alia, is inadequate data protection, since the digital identities of the users are stored centrally and the user behavior can be recorded.

US 2007/0294431 A1 discloses a further method for managing the digital identities which likewise requires user registration.

From the patent application DE 102008000067.1 "Method for reading attributes from an ID token" of the same applicant which was unpublished at the filing date of this application, a method is known, which allows an ID provider computer system to read one or more attributes from an ID token of a user in order to forward these to a service computer system.

SUMMARY OF THE INVENTION

By contrast, the invention is based on the object of providing an improved method for reading at least one attribute, and also an appropriate computer program product, an ID token and a computer system.

The objects on which the invention is based are respectively achieved by means of the features of one or more embodiments disclosed and/or described herein.

According to embodiments of the invention a method is provided for reading at least one attribute stored in an ID token, wherein the ID token is associated with a user. The method comprises the following steps: the user is authenticated to the ID token; a first computer system is authenticated to the ID token; following successful authentication of the user and the first computer system to the ID token, the first computer system effects read access to the at least one attribute stored in the ID token in order to transmit the at least one attribute to a second computer system, wherein the authentication of the first computer system to the ID token is performed based on a specification of an attribute, which is received by the first computer system from a third computer system (136). This allows a "confidence anchor" to be provided.

The invention allows one or more of the attributes stored in an ID token to be read by the first computer system, wherein the connection between the ID token and the first computer system can be set up via a network, particularly the Internet. The at least one attribute may be an indication of the identity of the user associated with the ID token, particularly of the user's "digital identity". By way of example, the first computer system reads the attributes surname, first name, address, in order to forward these attributes to a second computer system, for example an online service.

However, by way of example, it is also possible for just a single attribute to be read which is used not to establish the identity of the user but rather, by way of example, to check the authorization of the user to use a particular online service, such as the age of the user where the user wishes to use an online service which is reserved for a particular age group, or another attribute which documents the user's association with a particular group which is authorized to use the online service.

The ID token may be a portable electronic appliance, such as what is known as a USB stick, or may be a document, particularly a value document or security document.

In line with the invention, a "document" is understood to mean paper-based and/or plastic-based documents, such as identification documents, particularly passports, identification cards, visas and driver's licenses, vehicle registration certificates, vehicle registration documents, corporate identification cards, health cards or other ID documents and also chip cards, payment means, particularly bankers' cards and credit cards, waybills or other credentials, which incorporate a data memory for storing the at least one attribute.

Embodiments of the invention are thus particularly advantageous, since the at least one attribute is read from a particularly trustworthy document, for example an official document. It is also of particular advantage that central storage of the attributes is not necessary. The invention thus allows a particularly high level of trustworthiness for the communication of the attributes associated with a digital identity, accompanied by optimum data protection with extremely convenient handling.

According to embodiments of the invention first and second sets of ID provider computer systems are defined, which can be made up in principle in the same way but come with different rights: the first set of the ID provider computer systems is defined as trustworthy for the second computer system but has no rights for reading at least one attribute of the ID token. The second computer system may for example be a service computer system, which serves for providing a service for users.

The second set of ID provider computer systems is defined as trustworthy concerning the ID token and/or the fourth computer system, i.e. the user computer system, which means that it has reading rights for the at least one attribute of the ID token. The so called authentication domain is defined herein by the first and the second set of ID provider computer systems. For example the service computer system and the third computer system belong to the same authentication domain, meanwhile the fourth computer system, i.e. the user computer system and the first computer system belong to another differing authentication domain.

At least a subset of the second set of ID provider computer systems is defined as trustworthy for at least a subset of the first set of ID provider computer systems, wherein the subsets are not equal to the null set.

Hence, when a specification of an attribute is received by the user computer system from the service computer system, the user computer system forwards the specification of the attribute to an ID provider computer system of the subset of the first set. This ID provider computer system of the subset of the first set forwards the specification of the attribute to an ID provider computer system of the subset of the second set, which is defined as trustworthy by the ID provider computer system of the subset of the first set.

The ID provider computer system of the subset of the second set then reads the at least one attribute from the ID token of the user after a previous authentication. The at least one attribute is sent to the ID provider computer system of the subset of the first set by this ID provider computer system of the subset of the second set, from where the at least one attribute is forwarded to the service computer system. Optionally the at least one attribute of the ID provider computer system of the subset of the first set is forwarded firstly to the user computer system, from where the at least one attribute is then forwarded to the service computer system.

Preferably, the at least one attribute of the ID provider computer system of the subset of the second set is sent to the ID provider computer system of the subset of the first set in form of a signed message. The ID provider computer system of the subset of the first set is adapted to check the signature. If the signature is valid and identified as an ID provider computer system belonging to the subset of the second set, the ID provider computer system of the subset of the first set signs the at least one attribute on its part and forwards a corresponding message to the service computer system. The service computer system can check the validity of the signature and can trust the authenticity of the at least one attribute, because the signature has been generated by the ID provider computer system of the subset of the first set, which has been defined as trustworthy.

Embodiments of the invention are especially advantageous, because they allow legally compliant electronic legal relations without changing media beyond frontiers.

Embodiments of the invention are further especially advantageous, because a registration of the user for using the service computer system of the provided service is not mandatory. Because of the "statusless" character of the ID confirmation performance performed by the ID provider computer system, i.e. reading the at least one attribute it is not necessary that the user has been previously authenticated by one of the ID provider computer systems. Further it is particularly advantageous that no user-related data is stored in the ID provider computer systems.

According to one embodiment of the invention, the first computer system has at least one certificate which is used for authenticating the first computer system to the ID token. The certificate contains an indication of those attributes for which the first computer system has read authorization. The ID token uses said certificate to check whether the first computer system has the necessary read authorization for read access to the attribute before such read access can be performed by the first computer system.

According to one embodiment of the invention, the first computer system sends the at least one attribute read from the ID token directly to a second computer system. By way of example, the second computer system may be a server for providing an online service or another service, such as a banking service, or for ordering a product. By way of example, the user can open an account online, to which end attributes which contain the identity of the user are transmitted from the first computer system to the second computer system of a bank.

According to one embodiment of the invention, the attributes read from the ID token are transmitted from the first computer system to a fourth computer system of the user first of all. By way of example, the fourth computer system has an ordinary Internet browser which the user can use to open a web page on the second computer system. The user can input into the web page a request or order for a service or a product.

The second computer system then specifies those attributes, for example of the user or of his ID token, which it requires in order to provide the service or to take the order. The corresponding attribute specification, which contains the specification of these attributes, is then sent from the second computer system to the first computer system. This can be done with or without interposition of the fourth computer system. In the latter case, the user can specify the desired first computer system to the second computer system, for example by inputting the URL of the first computer system into a web page on the second computer system from the fourth computer system.

According to one embodiment of the invention, the service request from the user to the second computer system contains the indication of an identifier, wherein the identifier identifies the first computer system. By way of example, the identifier is a link, for example a URL on the first computer system.

According to one embodiment of the invention, the attribute specification is sent not directly from the second computer system to the first computer system but rather from the second computer system to the fourth computer system first of all. The fourth computer system has a plurality of predefined configuration data records, wherein the third computer has a plurality of predefined configuration data records, wherein each of the configuration data records specifies a subset of the attributes, at least one data source and a first computer system from a set of first computer systems, wherein the attribute specification is transmitted from the second computer system to the fourth computer system first of all, so that the fourth computer system is used to select at least one of the configuration data records which specifies a subset of the attributes which contains the at least one attribute specified in the attribute specification, and wherein the fourth computer forwards the attribute specification to the first computer system, and the connection to the ID token specified by the indication of the data source in the selected configuration data record is set up.

According to one embodiment of the invention, the attributes read from the ID token are signed by the first computer system and are then transmitted to the third computer system. The attributes are forwarded then to the fourth computer system. The user of the fourth computer system can thus read the attributes but without being able to alter them. Only after release by the user are the attributes forwarded from the fourth computer system to the second computer system.

According to one embodiment of the invention, the user can add further data to the attributes before they are forwarded.

According to one embodiment of the invention, the first computer system has a plurality of certificates with different read rights. On the basis of the receipt of the attribute specification, the first computer system selects one or more of these certificates in order to read the relevant attributes from the ID token or a plurality of different ID tokens.

According to one embodiment of the invention, the fourth computer system has at least one configuration data record which specifies an external data source for requesting a further attribute from the fourth computer system via the network.

According to one embodiment of the invention, the further attribute is requested after the at least one attribute has been read from the ID token, and after the fourth computer system has received the at least one attribute from the first computer system, wherein the request contains the at least one attribute.

In a further aspect, the invention relates to a computer program product, particularly a digital storage medium, with executable program instructions for performing a method according to the invention.

In a further aspect, the invention relates to an ID token with a protected memory area for storing at least one attribute, with means for authenticating a user, associated with the ID token, to the ID token, means for authenticating a first computer system to the ID token, means for setting up a protected connection to the first computer system which the first computer system can use to read the at least one attribute, wherein a necessary prerequisite for the reading of the at least one attribute from the ID token by the first computer system is the successful authentication of the user and of the first computer system to the ID token.

According to embodiments of the invention the second set of ID provider computer systems is defined by the identifier or by the identifiers.

In addition to the authentication of the first computer system to the ID token, as is known per se as "Extended Access Control", for example, for machine-readable travel documents (MRTDs) and is specified by the international aviation authority ICAO, the user thus has to authenticate himself to the ID token. By way of example, successful authentication of the user to the ID token unlocks the latter, so that the further steps, namely the authentication of the first computer system to the ID token and/or the setup of a protected connection for reading the attributes, can take place.

According to one embodiment of the invention, the ID token has means for end-to-end encryption. This allows the connection between the ID token and the first computer system to be set up via a third computer system of the user, since the user cannot make any changes to the data transmitted via the connection on account of the end-to-end encryption.

In a further aspect, the invention relates to a first computer system with a computer system having means for receiving an attribute specification via a network of a non-authorized computer system (136), wherein the attribute specification specifies at least one attribute, means for authenticating to an ID token, means for reading at least one attribute from the ID token via a protected connection, wherein a prerequisite for the reading of the at least one attribute is that a user associated with the ID token has authenticated himself to the ID token, and means for forwarding the at least one attribute to the non-authorized computer system.

According to embodiments of the invention the non-authorized computer system is an ID provider computer system of the first set, in particular the third computer system.

According to one embodiment of the invention, the first computer system may contain means for generating a request to the user. When the first computer system has received the attribute specification from the second computer system via the third computer system, for example, it then sends a request to the fourth computer system of the user, so that the user is asked to authenticate himself to the ID token. When the authentication of the user to the ID token has been performed successfully, the first computer system receives confirmation from the fourth computer system. The first computer system then authenticates itself to the ID token and a secure connection is set up between the ID token and the first computer system using end-to-end encryption.

According to one embodiment of the invention, the first computer system has a plurality of certificates which respectively specify different read rights. Following receipt of the attribute specification, the first computer system chooses at least one of said certificates with the read rights which are sufficient for reading the specified attributes.

Embodiments of the first computer system according to the invention are particularly advantageous, since they form a confidence anchor for the unfalsified digital identity of the user in combination with the need for authentication of the user to the ID token. A particular advantage in this context is that this does not require prior registration of the user with the computer system or central storage of the attributes of the users which form the digital identities.

According to one embodiment of the invention, the first computer system receives an identifier for the second computer system together with the attribute specification. Using the identifier, the computer system identifies the second computer system, which wishes to use the identification services, in order to charge the second computer system for this service. Alternatively or additionally the first computer system receives together with the specification of the attribute an identifier of the third computer system. Via the identifier the computer system identifies the third computer system, which would like to utilize the identification services for charging these services to the third computer system. The third computer system can further charge these charges to the second computer system, i.e. the provider of the service.

According one embodiment of the invention, the computer system is an officially certified trust center, particularly a trust center which is compliant with the signature act.

BRIEF DESCRIPTION OF THE DRAWINGS

Embodiments of the invention are explained in more detail below with reference to the drawings, in which.

DETAILED DESCRIPTION OF THE INVENTION

Elements of the embodiments below which correspond to one another are identified by the same reference symbols.

Figure 1:
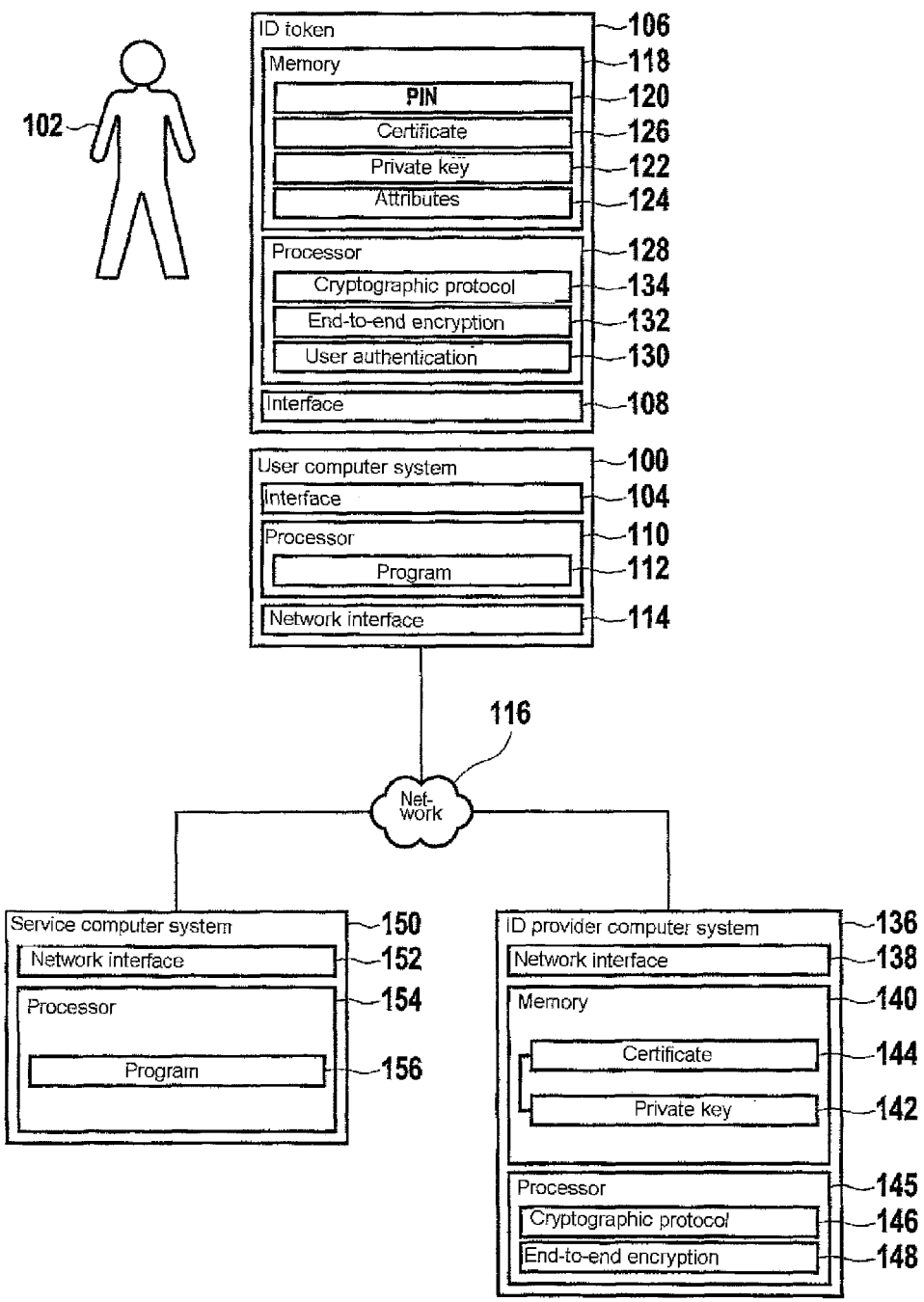
FIG. 1 shows a block diagram of a first embodiment of an ID-token according to the invention.

FIG. 1 shows a user computer system 100 of a user 102. The user computer system 100 may be a personal computer, a portable computer, such as a laptop or palmtop computer, a personal digital assistant, a mobile telecommunication appliance, particularly a smart phone or the like. The user computer system 100 has an interface 104 for communication with an ID token 106 which has an appropriate interface 108.

The user computer system 100 has at least one processor 110 for executing program instructions 112 and also a network interface 114 for communication via a network 116. The network may be a computer network, such as the Internet.

The ID token 106 has an electronic memory 118 with protected memory areas 120, 122 and 124. The protected memory area 120 is used for storing a reference value which is required for authenticating the user 102 to the ID token 106. Said reference value is an identifier, for example, particularly what is known as a personal identification number (PIN), or is reference data for a biometric feature of the user 102 which can be used for authenticating the user to the ID token 106.

The protected area 122 is used for storing a private key and the protected memory area 124 is used for storing attributes, for example of the user 102, such as his name, place of residence, date of birth, sex, and/or attributes which relate to the ID token itself, such as the institution which produced or issued the ID token, the validity period of the ID token, or an identifier for the ID token, such as a passport number or a credit card number.

The electronic memory 118 may also have a memory area 126 for storing a certificate. The certificate contains a public key which is associated with the private key stored in the protected memory area 122. The certificate may have been produced on the basis of a public key infrastructure (PKI) standard, for example on the basis of the X.509 standard.

The certificate does not necessarily have to be stored in the electronic memory 118 of the ID token 106. Alternatively or in addition, the certificate may also be stored in a public directory server.

The ID token 106 has a processor 128. The processor 128 is used for executing program instructions 130, 132 and 134. The program instructions 130 are used for user authentication, i.e. for authenticating the user 102 to the ID token.

The ID token can further comprise a storage portion (not shown in FIG. 1), which services for storing at least one identifier for identifying an ID provider computer system of the second set. At least one subset of the second set of the ID provider computer systems is defined as not trustworthy concerning the service computer system 150, but the subset has rights for reading at least one of the attributes of the ID token 106.

In an embodiment using PINs, the user 102 inputs his PIN, in order to authenticate himself, into the ID token 106, for example via the user computer system 100. Execution of the program instructions 130 then accesses the protected memory area 120 in order to compare the input PIN with the reference value stored therein for the PIN. If the input PIN matches the reference value of the PIN, the user 102 is deemed to have been authenticated.

Alternatively, a biometric feature of the user 102 is captured. By way of example, the ID token 106 has a fingerprint sensor for this purpose, or a fingerprint sensor is connected to the user computer system 100. The biometric data captured from the user 102 are compared with the biometric reference data stored in the protected memory area 120 by executing the program instructions 130 in this embodiment. If there is a sufficient match between the biometric data captured from the user 102 and the biometric reference data then the user 102 is deemed to have been authenticated.

The program instructions 134 are used for executing the steps of a cryptographic protocol which relate to the ID token 106 in order to authenticate an ID provider computer system 136 to the ID token 106. The cryptographic protocol may be a challenge/response protocol based on a symmetric key or an asymmetric key pair.

By way of example, the cryptographic protocol implements an extended access control method, as is specified for machine-readable travel documents (MRTDs) by the international aviation authority (ICAO). Successful execution of the cryptographic protocol authenticates the ID provider computer system 136 to the ID token, thus proving its read authorization for reading the attributes stored in the protected memory area 124. The authentication may also be reciprocal, i.e. the ID token 106 then also needs to authenticate itself to the ID provider computer system 136 on the basis of the same or a different cryptographic protocol.

The program instructions 132 are used for the end-to-end encryption of data transmitted between the ID token 106 and the ID provider computer system 136, but at least of the attributes read by the ID provider computer system 136 from the protected memory area 124. For the end-to-end encryption, it is possible to use a symmetric key which is agreed between the ID token 106 and the ID provider computer system 136 when the cryptographic protocol is executed, for example.

As an alternative to the embodiment shown in FIG. 1, the user computer system 100 can use its interface 104 to communicate with the interface 108 not directly but rather via a reader, connected to the interface 104, for the ID token 106. This reader, for example what is known as a class 2 chip card terminal, can also be used to input the PIN.

The ID provider computer system 136 has a network interface 138 for communication via the network 116. The ID provider computer system 136 also has a memory 140 which stores a private key 142 for the ID provider computer system 136 and also the appropriate certificate 144. This certificate may also be a certificate based on a PKI standard, for example, such as X.509.

The ID provider computer system 136 also has at least one processor 145 for executing program instructions 146 and 148. By executing the program instructions 146, the steps of the cryptographic protocol which relate to the ID provider computer system 136 are executed. Overall, the cryptographic protocol is thus implemented through execution of the program instructions 134 by the processor 128 of the ID token 106 and also through execution of the program instructions 146 by the processor 145 of the ID provider computer system 136.

The program instructions 148 are used to implement the end-to-end encryption on the ID provider computer system 136, for example on the basis of the symmetric key which has been agreed between the ID token 106 and the ID provider computer system 136 when the cryptographic protocol is executed. In principle, it is possible to use any method for agreeing the symmetric key for the end-to-end encryption which is known per se beforehand, such as a Diffie-Hellman key exchange.

The ID provider computer system 136 is preferably situated in a particularly protected environment, particularly in what is known as a trust center, so that the ID provider computer system 136 forms the confidence anchor for the authenticity of the attributes read from the ID token 106 in combination with the need for authentication of the user 102 to the ID token 106.

A service computer system 150 may be designed to take an order or a commission for a service or a product, particularly an online service. By way of example, the user 102 can open an account at a bank or use another financial or banking service online via the network 116. The service computer system 150 may also be in the form of an online warehouse, so that the user 102 can purchase a mobile telephone or the like online, for example. In addition, the service computer system 150 may also be designed to deliver digital content, for example for the download of music data and/or video data.

To this end, the service computer system 150 has a network interface 152 for connection to the network 116. In addition, the service computer system 150 has at least one processor 154 for executing program instructions 156. Execution of the program instructions 156 generates dynamic HTML pages, for example, which the user 102 can use to input his commission or his order.

Depending on the nature of the commissioned or ordered product or the service, the service computer system 150 needs to check one or more attributes of the user 102 and/or his ID token 106 using one or more prescribed criteria. Only if this check is passed is the order or the commission from the user 102 taken and/or performed.

By way of example, opening a bank account or purchasing a mobile telephone with an associated contract requires the user 102 to disclose his identity to the service computer system 150 and requires this identity to be checked. In the prior art, the user 102 must do this by presenting his identification card, for example. This process is replaced by the reading of the digital identity of the user 102 from his ID token 106.

Depending on the instance of application, however, the user 102 does not need to disclose his identity to the service computer system 150, but rather it suffices to communicate only one of the attributes, for example. By way of example, the user 102 can use one of the attributes to provide evidence that he belongs to a particular group of people which is authorized to access data held on the service computer system 150 for download. By way of example, such a criterion may be a minimum age of the user 102 or the association of the user 102 with a group of people which has access authorization for particular confidential data.

To use the service provided by the service computer system 150, the procedure is as follows:

1. Authentication of the user 102 to the ID token 106.

The user 102 authenticates himself to the ID token 106. In an implementation using PINs, the user 102 does this by inputting his PIN, for example using the user computer system 100 or a chip card terminal connected thereto. By executing the program instructions 130, the ID token 106 then checks the correctness of the input PIN. If the input PIN matches the PIN's reference value stored in the protected memory area 120, the user 102 is deemed to have been authenticated. The procedure may be similar if a biometric feature of the user 102 is used to authenticate him, as described above.

2. Authentication of the ID provider computer system 136 to the ID token 106.

To this end, a connection is set up between the ID token 106 and the ID provider computer system 136 via the user computer system 100 and the network 116. By way of example, the ID provider computer system 136 transmits its certificate 144 via this connection to the ID token 106. The program instructions 134 then generate what is known as a challenge, i.e. a random number, for example. This random number is encrypted using the public key of the ID provider computer system 136, which is contained in the certificate 144. The resulting cipher is sent from the ID token 106 via the connection to the ID provider computer system 136. The ID provider computer system 136 decrypts the cipher using its private key 142 and in this way obtains the random number. The random number is returned by the ID provider computer system 136 to the ID token 106 via the connection. By executing the program instructions 134, said ID token checks whether the random number received from the ID provider computer system 136 matches the originally generated random number, i.e. the challenge. If this is the case, the ID provider computer system 136 is deemed to have been authenticated to the ID token 106. The random number can be used as a symmetric key for the end-to-end encryption.

3. When the user 102 has successfully authenticated himself to the ID token 106, and when the ID provider computer system 136 has successfully authenticated itself to the ID token 106, the ID provider computer system 136 is provided with read authorization for reading an attribute, a plurality of attributes or all of the attributes stored in the protected memory area 124. On the basis of a relevant read command which the ID provider computer system 136 sends to the ID token 106 via the connection, the requested attributes are read from the protected memory area 124 and they are encrypted by executing the program instructions 132. The encrypted attributes are transmitted via the connection to the ID provider computer system 136, where they are decrypted by executing the program instructions 148. This provides the ID provider computer system 136 with knowledge of the attributes read from the ID token 106.

These attributes are signed by the ID provider computer system 136 using its certificate 144 and are transmitted via the user computer system 100 or directly to the service computer system 150. This notifies the service computer system 150 of the attributes read from the ID token 106, so that the service computer system 150 can check these attributes using the prescribed one or more criteria so as then possibly to provide the service requested by the user 102.

The need to authenticate the user 102 to the ID token 106 and to authenticate the ID provider computer system 136 to the ID token 106 provides the necessary confidence anchor, so that the service computer system 150 can be certain that the attributes of the user 102 which have been communicated to it by the ID provider computer system 136 are correct and not falsified.

Depending on the embodiment, the order of the authentication may be different. By way of example, provision may be made for the user 102 to have to authenticate himself to the ID token 106 first of all, followed by the ID provider computer system 136. In principle, however, it is also possible for the ID provider computer system 136 to have to authenticate itself to the ID token 106 first of all, followed only then by the user 102.

In the first case, the ID token 106 is designed, by way of example, such that it is unlocked only through input of a correct PIN or a correct biometric feature by the user 102. Only this unlocking allows the program instructions 132 and 134 to start and hence the ID provider computer system 136 to be authenticated.

In the second case, it is also possible to start the program instructions 132 and 134 even when the user 102 has not authenticated himself to the ID token 106. In this case, by way of example, the program instructions 134 are in a form such that the ID provider computer system 136 cannot perform read access to the protected memory area 124 for the purpose of reading one or more of the attributes until after the program instructions 130 have signaled that the user 102 has also been successfully authenticated.

Of particular advantage is the utilization of the ID token 106 for e-commerce and e-government applications, for example, specifically without media disruption and legally on the basis of the confidence anchor formed by the need for the user 102 and the ID provider computer system 136 to be authenticated to the ID token 106. Of particular advantage is also the fact that central storage of the attributes of various users 102 is not necessary, which means that the data protection problems which exist in the prior art are solved hereby. As far as the convenience of the application of the method is concerned, it is of particular advantage that prior registration of the user 102 in order to use the ID provider computer system 136 is not necessary.

In the considered embodiment there is no identifier for the ID provider computer system 136 stored in the storage of the ID token. Accordingly, the ID provider computer system 136 also does not have rights for reading the attributes from the ID token. However, an identifier for the ID provider computer system 136' is stored in the storage of the ID token (compare FIG. 3), which is in principal made up similar to the ID provider computer system 136 and which has rights for reading the attributes from the ID token.

Figure 2:
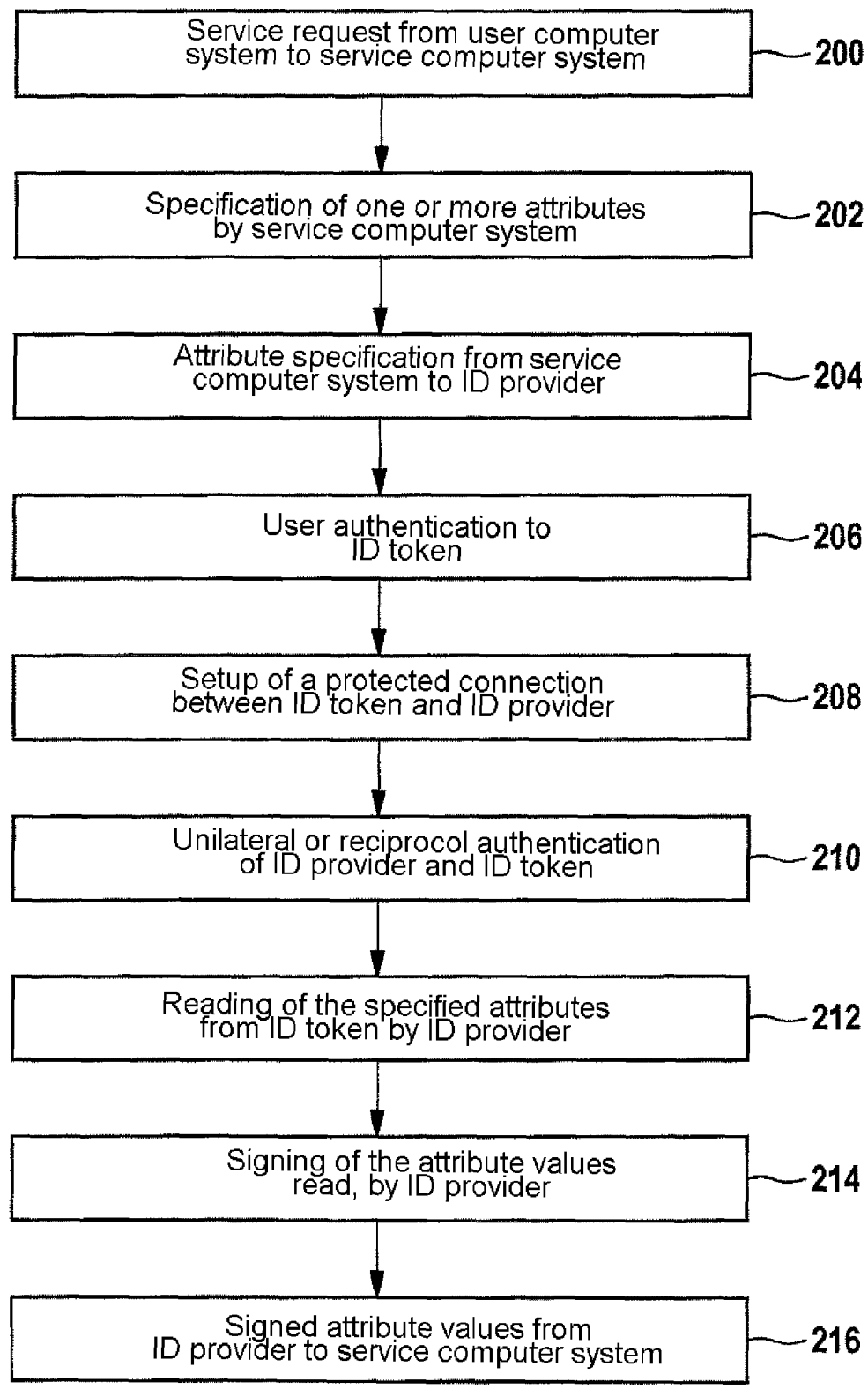
FIG. 2 shows a flowchart of an embodiment of a method according to the invention.

FIG. 2 shows an embodiment of a method according to the invention. In step 200, a service request is sent from the user computer system to the service computer system. By way of example, the user does this by starting an Internet browser on the user computer system and inputting a URL to call a web page on the service computer system. The user then inputs his service request into the called web page, for example in order to order or commission a service or a product.

In step 202, the service computer system 150 then specifies one or more attributes which it requires in order to check the user's authorization for the service request. In particular, the service computer system can specify attributes which determine the digital identity of the user 102. This specification of the attributes by the service computer system 150 may be firmly prescribed or can be determined individually by the service computer system 150 using prescribed rules, depending on the service request.

In step 204, the attribute specification, i.e. the specification performed in step 202 for the one or more attributes, is transmitted from the service computer system to the ID provider computer system, specifically either directly or via the user computer system.

In order to provide the ID provider computer system with the opportunity to read attributes from his ID token, the user authenticates himself to the ID token in step 206.

In step 208, a connection is set up between the ID token and the ID provider computer system. This is preferably a protected connection, for example on the basis of what is known as a secure messaging method.

In step 210, the ID provider computer system is at least authenticated to the ID token via the connection which has been set up in step 208. In addition, there may also be provision for the ID token to be authenticated to the ID provider computer system.

When both the user and the ID provider computer system have been successfully authenticated to the ID token, the ID provider computer system is provided with the access authorization for reading the attributes by the ID token. In step 212, the ID provider computer system sends one or more read commands for reading the attributes required according to the attribute specification from the ID token. The attributes are then transmitted using end-to-end encryption via the protected connection to the ID provider computer system, where they are decrypted.

The attribute values which have been read are signed by the ID provider computer system in step 214. In step 216, the ID provider computer system sends the signed attribute values via the network. The signed attribute values reach the service computer system either directly or via the user computer system. In the latter case, the user may have the opportunity to take note of the signed attribute values and/or to add further data to them. Provision may be made for the signed attribute values, possibly with the added data, to be forwarded from the user computer system to the service computer system only following release by the user. This provides the greatest possible transparency for the user in terms of the attributes sent from the ID provider computer system to the service computer system.

If the ID provider computer system belongs to an intersection of the first and the second set, there is no further action necessary, because such a ID provider computer system belongs to both authentication domains. If this is not the case, the attribute specification is sent in step 204 to an ID provider computer system of the first set and is then forwarded from there to an ID provider computer system of the second set. Steps 208 through 216 are then performed by the ID provider computer system of the second set. Sending the signed attribute values from the ID provider computer system of the second set to the service computer system can be performed via the ID provider computer system of the first set.

Figure 3A:
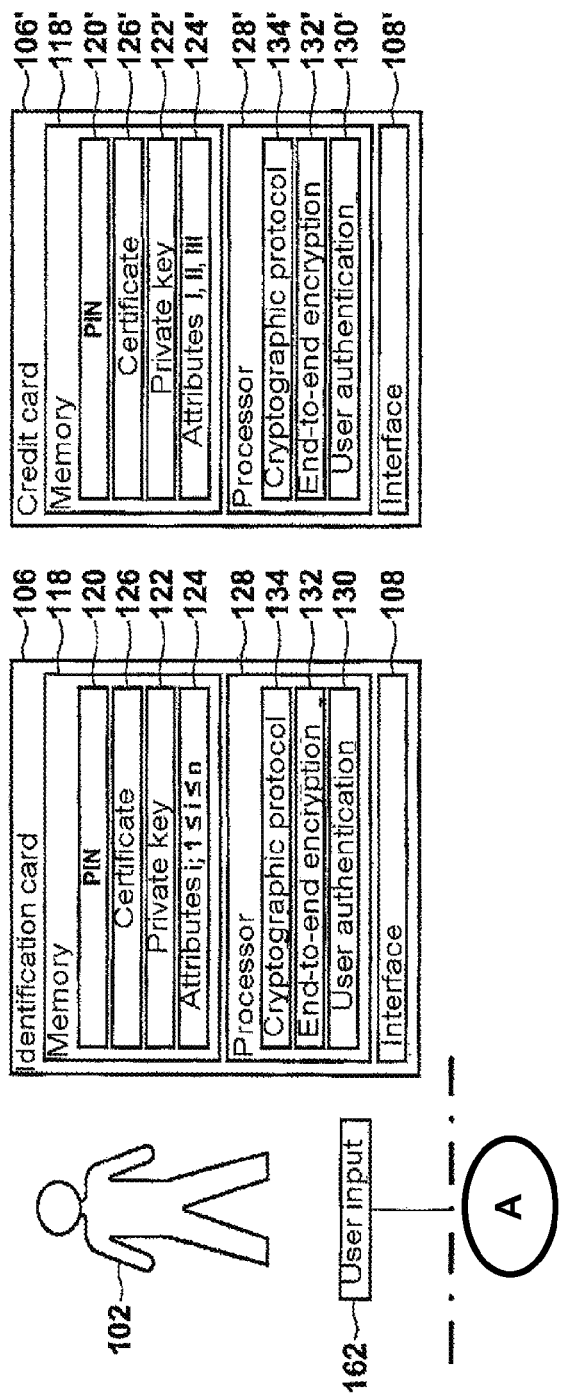
FIGS. 3a, 3b, 3c show a collective block diagram of further embodiments of computer systems according to the invention.
Figure 3B:
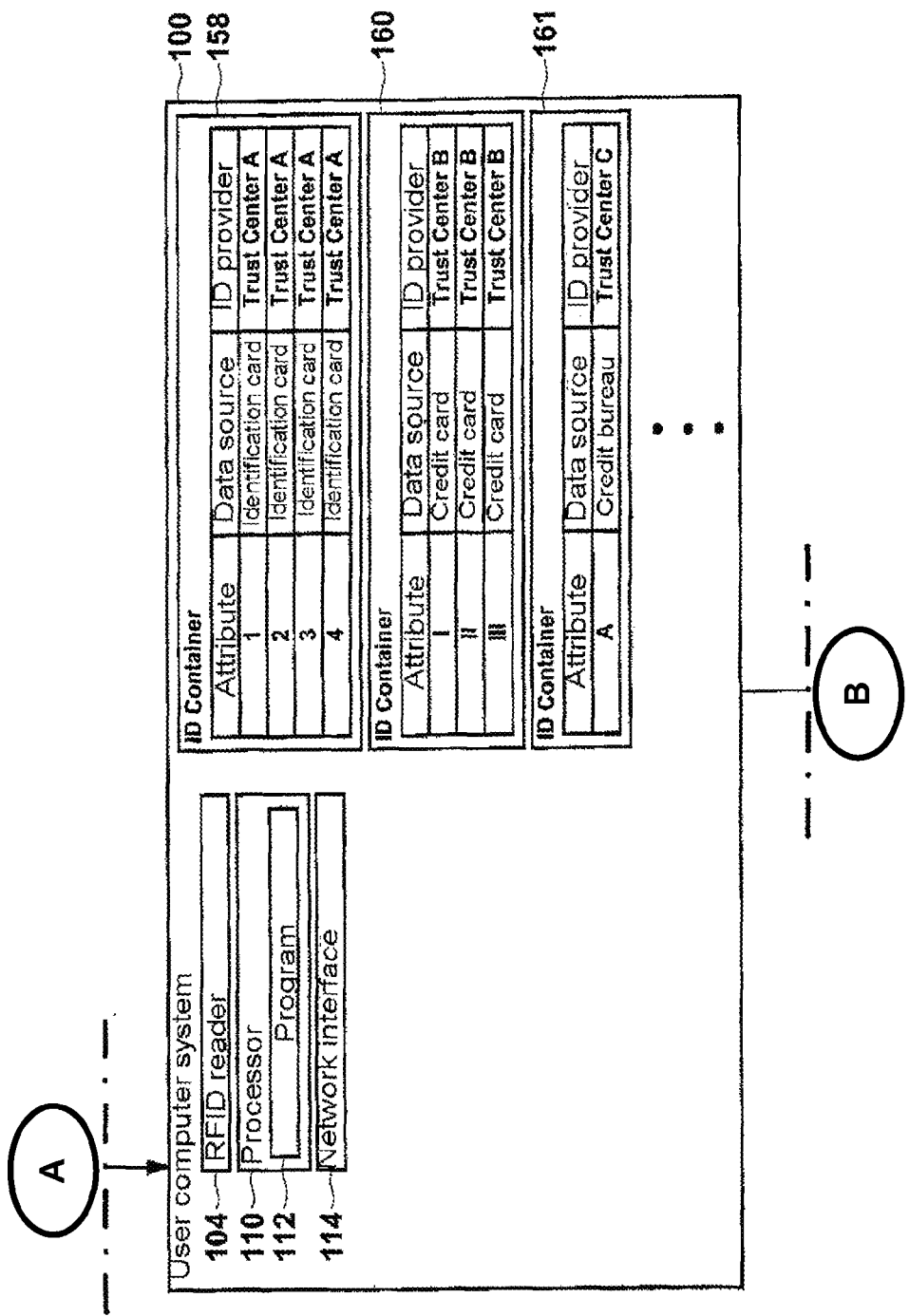
Figure 3C:
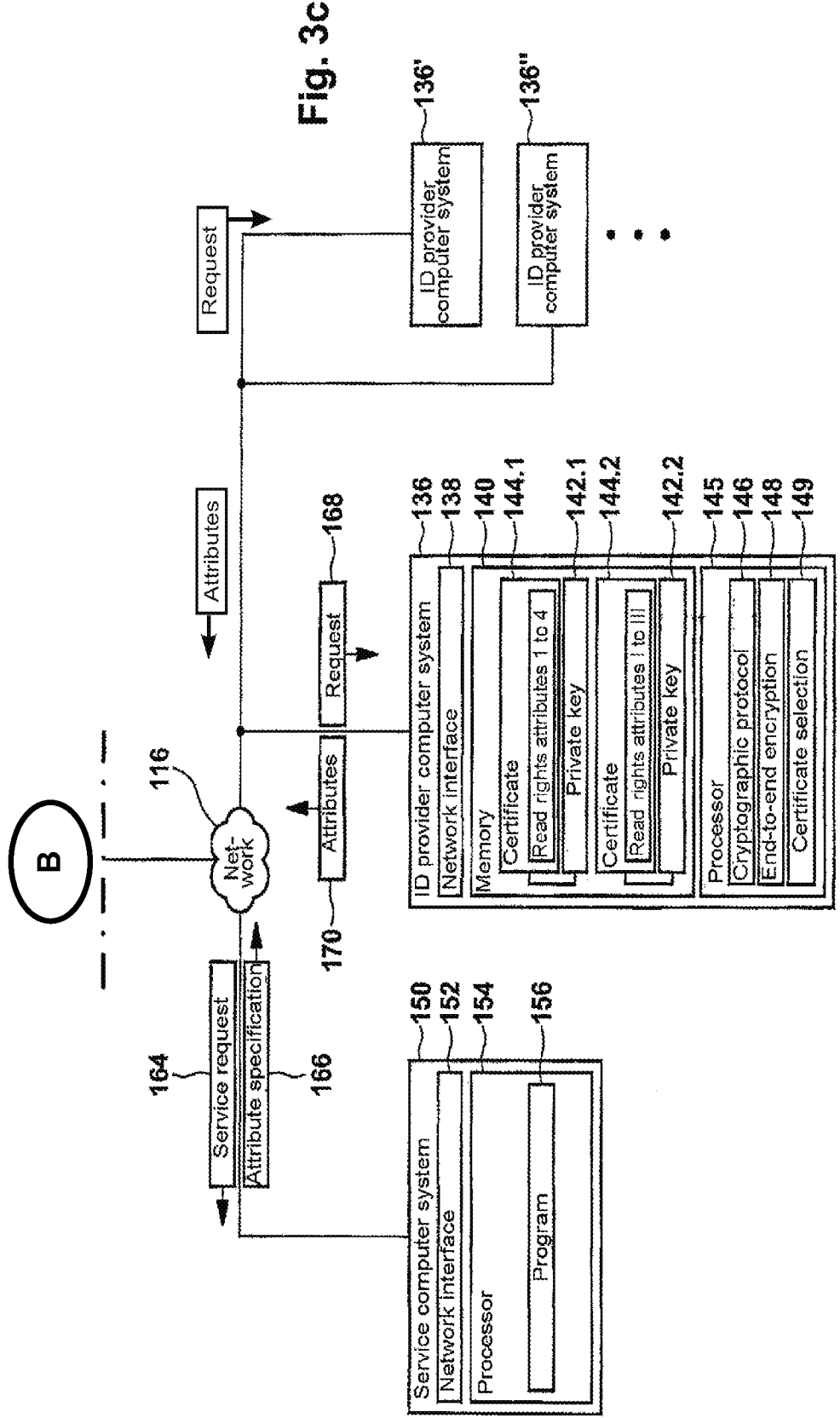

FIGS. 3a, 3b, 3c show further embodiments of an ID token according to the invention and computer systems according to the invention. In the embodiment in FIGS. 3a, 3b, 3c, the ID token 106 is in the form of a document, such as a paper-based and/or plastic-based document with an integrated electronic circuit, which forms the interface 108, the memory 118 and the processor 128. By way of example, the integrated electronic circuit may be what is known as a radio tag, which is also called an RFID tag or RFID label. Alternatively, the interface 108 may be equipped with contacts or be in the form of a dual mode interface.

In particular, the document 106 may be a value document or security document, such as a machine-readable travel document (MRTD), such as an electronic passport or an electronic identification card, or may be payment means, such as a credit card.

In the embodiment under consideration in the present case, the protected memory area 124 stores the attributes i, wherein $1 \le i \le n$. It is subsequently assumed, without any limitation of the general nature, that the ID token 106 shown by way of example in FIGS. 3a, 3b, 3c is an electronic identification card. By way of example, the attribute i=1 is the surname, the attribute i=2 is the first name, the attribute i=3 is the address and the attribute i=4 is the date of birth, etc.

In the embodiment under consideration here, the interface 104 of the user computer system 100 may be in the form of an RFID reader, which may form an integral part of the user computer system or may be connected thereto as a separate component.

The user 102 has one or more further ID tokens which are basically of the same design, such as an ID token 106' which is a credit card.

The user computer system 100 may store a plurality of configuration data records 158, 160, . . . . Each of the configuration data records indicates for a particular set of attributes a data source and an ID provider computer system which has reading rights for the specified data source. Hence, this ID provider computer system may be ID provider computer systems of the second set.

In this embodiment, the user computer system 100 can use the network 116 to address different ID provider computer systems 136, 136', 136" . . . which may respectively be associated with different "trust centers". By way of example, the ID provider computer system 136 is associated with the trust center A, and the ID provider computer system 136', which is of the same design in principle, may be associated with another trust center B and the ID provider computer system 136' may be associated with another trust center C. The ID provider computer system 136, 136', 136", . . . can be made up in principal in the same way, which is explained in detail for the ID provider computer system 136. The ID provider computer systems 136, 136', 136", . . . can be different concerning the reading rights for the ID tokens 106, 106', as it is the case for this considered embodiment.

The configuration data record 158, which is also called an ID container, has the set of attributes for the attributes i=1 to i=4 defined in it. These attributes respectively have the data source "identification card", i.e. the ID token 106, and the trust center A, i.e. the ID provider computer system 136, associated with them. The latter may be specified in the form of its URL, for example, in the configuration data record 158.

By contrast, the configuration data record 116 has a set of attributes I, II and III defined in it. The data source indicated for these attributes is the respective credit card, i.e. the ID token 106'. The ID token 106' has a protected memory area 124' which stores the attributes I, II, III. The attribute I may be the name of the holder of the credit card, for example, the attribute II may be the credit card number and the attribute III may be the validity of the credit card, etc.

The ID provider computer system indicated in the configuration data record 160 is the ID provider computer system 136' of the trust center B.

As an alternative to the embodiment shown in FIGS. 3a, 3b, 3c, it is also possible for different data sources and/or different ID provider computer systems to be indicated in the same configuration data record for different attributes.

In the embodiment in FIGS. 3a, 3b, 3c, each of the ID provider computer systems 136, 136', . . . may have a respective plurality of certificates.

By way of example, the memory 140 of the ID provider computer system 136, which is shown by way of example in FIGS. 3a, 3b, 3c, stores a plurality of certificates, such as the certificates 144.1 and 144.2 with the respective associated private keys 142.1 and 142.2. In the certificate 144.1, read rights for the ID provider computer system 136 are defined for the attributes i=1 to i=4, whereas in the certificate 144.2, read rights are defined for the attributes I to III.

Without loss of generality it is assumed that the ID provider computer systems 136 belong to the first set, i.e. the set of the ID provider computer systems, which are considered as being trustworthy by the service computer system 150, that the ID provider computer systems 136', 136", . . . do not belong to the first set but only to the second set. The ID provider computer system 136 belongs to the subset of the first and the second sets.

The first set can for example be defined in a configuration storage of the service computer system 150 by identifiers of the ID provider computer systems of the first set. These identifiers can be programmed in program 156. A further possibility is that the identifiers of the first set of the ID provider computer systems are stored in a directory server, from which the service computer system calls the identifiers.

Accordingly is the situation for the definition of the second set. The second set can be defined directly on the level of the ID tokens by storing the identifiers of the ID provider computer system of the second set there.

To use a service provided by the service computer system 150, the user 102 first of all makes a user input 162 into the user computer system 100, for example in order to input his request for the desired service into a web page on the service computer system 150. Said service request 164 is transmitted from the user computer system 100 via the network 116 to the service computer system 150.

The service computer system 150 then responds with an attribute specification 166, i.e. by specifying those attributes which the service computer system 150 requires in order to handle the service request 164 from the user 102. By way of example, the attribute specification can be made in the form of the attribute name, such as "surname", "first name", "address", "credit card number". The attribute specification 166 can comprise a designation of one or more identifiers of the ID provider computer system of the first set.

Subsequently it is assumed without loss of generality that the identifier of the ID provider computer systems 138 is transmitted with the attribute specification 166. Alternatively the identifier can be requested by the user computer system 100 from the directory server.

The receipt of the attribute specification 166 is signaled to the user 102 by the user computer system 100. The user 102 can then select one or, if necessary, a plurality of the configuration data records 158, 160, . . . which respectively define sets of attributes which contain the attributes according to the attribute specification 166, at least as a subset.

If the attribute specification 166 merely requires notification of the surname, the first name and the address of the user 102, for example, the user 102 can select the configuration data record 158. If, by contrast, the credit card number is additionally specified in the attribute specification 166, the user 102 can additionally select the configuration data record 160. This process can also be performed fully automatically by the user computer system 100, for example by executing the program instructions 112.

Subsequently, it is first of all assumed that only one of the configuration data records, such as the configuration data record 158, is selected on the basis of the attribute specification 166.

The user computer system 100 then sends a request 168 to the ID provider computer systems indicated in the chosen configuration data record, in the example under consideration to the ID provider computer system 136 of the trust center A. Said request 168 contains an indication of the attributes, according to the attribute specification 166, which need to be read by the ID provider computer system 136 from the data source indicated in the configuration data record 158.

The ID provider computer system 136 then selects one or more of its certificates which have the read rights required for reading these attributes. If, by way of example, the attributes i=1 to 3 are to be read from the identification card, the ID provider computer system 136 selects its certificate 144.1, which defines the read rights required therefor. This selection of the certificate is performed by executing the program instructions 149.

Next, the execution of the cryptographic protocol is started. By way of example, the ID provider computer system 136 to this end sends a response to the user computer system 100. The user computer system 100 then asks the user 102 to authenticate himself to the specified data source, i.e. in this case to the identification card.

The user 102 then brings his identification card, i.e. the ID token 106, into the range of the RFID reader 104, and inputs his PIN, for example, in order to authenticate himself. The successful authentication of the user 102 to the ID token 106 unlocks the latter for performance of the cryptographic protocol, i.e. for performance of the program instructions 134. Subsequently, the ID provider computer system 136 authenticates itself to the ID token 106 using the selected certificate 144.1, for example using a challenge/response method. This authentication may also be reciprocal. Following successful authentication of the ID provider computer system 136 to the ID token 106, the ID provider computer system sends a read request for reading the requisite attributes to the user computer system 100, and the latter forwards this via the RFID reader 104 to the ID token 106. The ID token 106 uses the certificate 144.1 to check whether the ID provider computer system 136 has the requisite read rights. Herein this is the case, because the ID provider computer system 136 belongs to the second set, such that the desired attributes are read from the protected memory area 124 and are transmitted by means of end-to-end encryption to the ID provider computer system via the user computer system 100.

The ID provider computer system 136 then sends a response 170, which contains the attributes which have been read, via the network 116 to the service computer system 150. The response 170 is digitally signed with the certificate 144.1.

Alternatively, the ID provider computer system 136 sends the response 170 to the user computer system 100. The user 102 is then provided with the opportunity to read the attributes contained in the response 170 and to decide whether or not he actually wishes to forward these attributes to the service computer system 150. Only when a release command from the user 102 has been input into the user computer system 100 is the response 170 then forwarded to the service computer system 150. In this embodiment, it is also possible for the user 102 to add further data to the response 170. The signature of the answer 170 is checked by the service computer system 150. As it originates from the ID provider computer system 136, which belongs to the first set, the answer 170 is regarded as trustworthy by the service computer system 150.

If in contrast the attribute specification 166 specifies one or more attributes, which can be read by a data source, to which an ID provider computer system has access that belongs to the second set but not to the first set, it is proceeded as follows:

The user computer system 100 forwards the attribute specification 166 in form of the request 168 to an ID provider computer system of the first set, i.e. in the embodiment considered herein to the ID provider computer system 136. The request 168 comprises in addition to attribute specification 166 a designation of the ID provider computer system of the second set, which has access to the specified attributes. The ID provider computer system of the first set that receives request 168 forwards this request then as request 168' to the ID provider computer system of the second set that was designated in request 168.

This ID provider computer system of the second set authenticates itself to the data source and reads the at least one attribute according to the attribute specification from the data source as described above for ID provider computer system 136.

The ID provider computer system of the second set then generates answer 170' that comprises the attribute. The ID provider computer system of the second set signs answer 170' and sends the answer 170' to the ID provider computer system of the first set.

The ID provider computer system of the first set considers the ID provider computer system of the second set as trustworthy. After checking the signature of answer 170', which has been received from the ID provider computer system of the second set, the ID provider computer system of the first set signs answer 170' on its part and sends answer 170' either to the user computer system 100 for forwarding it to the service computer system 150 or directly to the service computer system 150. The service computer system 150 checks then the signature of the ID provider computer system of the first set. As the service computer system 150 considers the ID provider computer system of the first set as trustworthy it considers the attributes transmitted together with answer 170' as valid as long as the signature of the ID provider computer system of the first set is valid.

For example attribute specification 166 comprises a specification of the attributes I, II and III. After having received these attribute specifications via network 116 the user computer system 100 determines that these attributes are stored on the data source credit card, i.e. on the ID token 106'. For this purpose the ID provider trust centre b, i.e. the ID provider computer system 136' of the second set, has reading rights. The ID provider computer system 136' does not belong to the first set, which is considered as trustworthy by the service computer system 150. The user computer system 100 can determine this for example by a request to a public directory server. In the same way the user computer system can determine by a request to a directory service which ID provider computer system/computer systems belong to the first set, i.e. to the set of the ID provider computer systems considering the service computer system 150 as trustworthy. In this exemplary embodiment this is the ID provider computer system 136.

The user computer system 100 forwards then the attribute specification 166 in form of request 168 to the ID provider computer system 136 of the first set, wherein request 168 comprises an identifier identifying the ID provider computer system 136'. The ID provider computer system 136 forwards request 168 to the ID provider computer system 136', which is specified in request 168 and which processes request 168'.

The ID provider computer system 136' also reads attributes I, II, III from ID token 106' for example according to the steps 204-206 of the embodiment according to FIG. 2. The ID provider computer system 136' sends answer 170' which comprises the read attributes I, II, III and has been signed by the ID provider computer system 136', not directly to the service computer system 150 or to the user computer system 100, but the ID provider computer system 136' sends the answer to the ID provider computer system 136, from which it has received request 168'.

The ID provider computer system 136 then checks the validity of the signature of the ID provider computer system 136'. If the second signature is valid the ID provider computer system 136 considers the attribute values I, II and III transmitted together with answer 170' as valid and signs answer 170' on its own in order to send it to the user computer system 100 for forwarding it to the service computer system 150 or in order to send answer 170' directly to the service computer system 150.

The attribute specification 166 can be read by the service computer system 150 for example as a so called soft token. If necessary the user computer system 100 adds the designation of an ID provider computer system of the second set, i.e. the ID provider computer system 136', to this soft token, which is then forwarded as request 168 to the ID provider computer system 136. A trusted connection exists between service computer system 150 and ID provider computer system 136, which can be designated by the service computer system 150 in the soft token. A query to a public directory server by the user computer system 100 is unnecessary in this case.

If a plurality of ID provider computer systems 136, 136', . . . are involved, the individual responses from the ID provider computer systems can be combined by the user computer system 100 in a single response which all of the attributes according to the attribute specification 166 contain, said response then being sent from the user computer system 100 to the service computer system 150.

According to one embodiment of the invention, the user 102 can disclose one or more of his attributes to the service computer system 150 on the occasion of the service request 164, for example by transmitting said attributes of the user to the service computer system via the network 116 as part of the service request 164. In particular, the user 102 can input said attributes into the web page on the service computer system 150. The correctness of these attributes is then confirmed by the response 170, i.e. the service computer system 150 can compare the attributes received from the user 102 with the attributes read from the ID token 106 by the ID provider computer 136 and can check them for a match.

According to a further embodiment of the invention, it is also possible for at least one further attribute to be indicated in the attribute specification 166, said attribute not being stored on one of the ID tokens of the user 102 but rather being able to be requested from an external data source. By way of example, this may involve an attribute relating to the creditworthiness of the user 102. To this end, the user computer system 100 may contain a further configuration data record 161 which contains the indication of a data source and of an ID provider computer system for the attribute A—e.g. creditworthiness. The data source may be an online credit agency, such as a credit bureau, Dun & Bradstreet or the like. By way of example, the ID provider computer system indicated is a trust center C, as in the embodiment in FIG. 3. In this case, the data source may be located in the trust center C.

In order to request the attribute A, the user computer system 100 thus sends an appropriate request (not shown in FIG. 3) to the trust center C, i.e. the ID provider computer system 136". The latter then delivers the attribute A, which the user computer system 100 forwards to the service computer system 150 together with the further attributes which have been read from the ID token(s) of the user 102.

Preferably, the attribute A is requested after the attributes relating to the digital identity of the user 102 have already been requested from one of the ID tokens of the user 102, and have been received as a signed response 170 by the user computer system 100, for example. The request for the attribute A from the ID provider computer system 136" by the user computer system 100 then contains the signed response 170, so that the ID provider computer system 136" has reliable information about the identity of the user 102.

Figure 4:
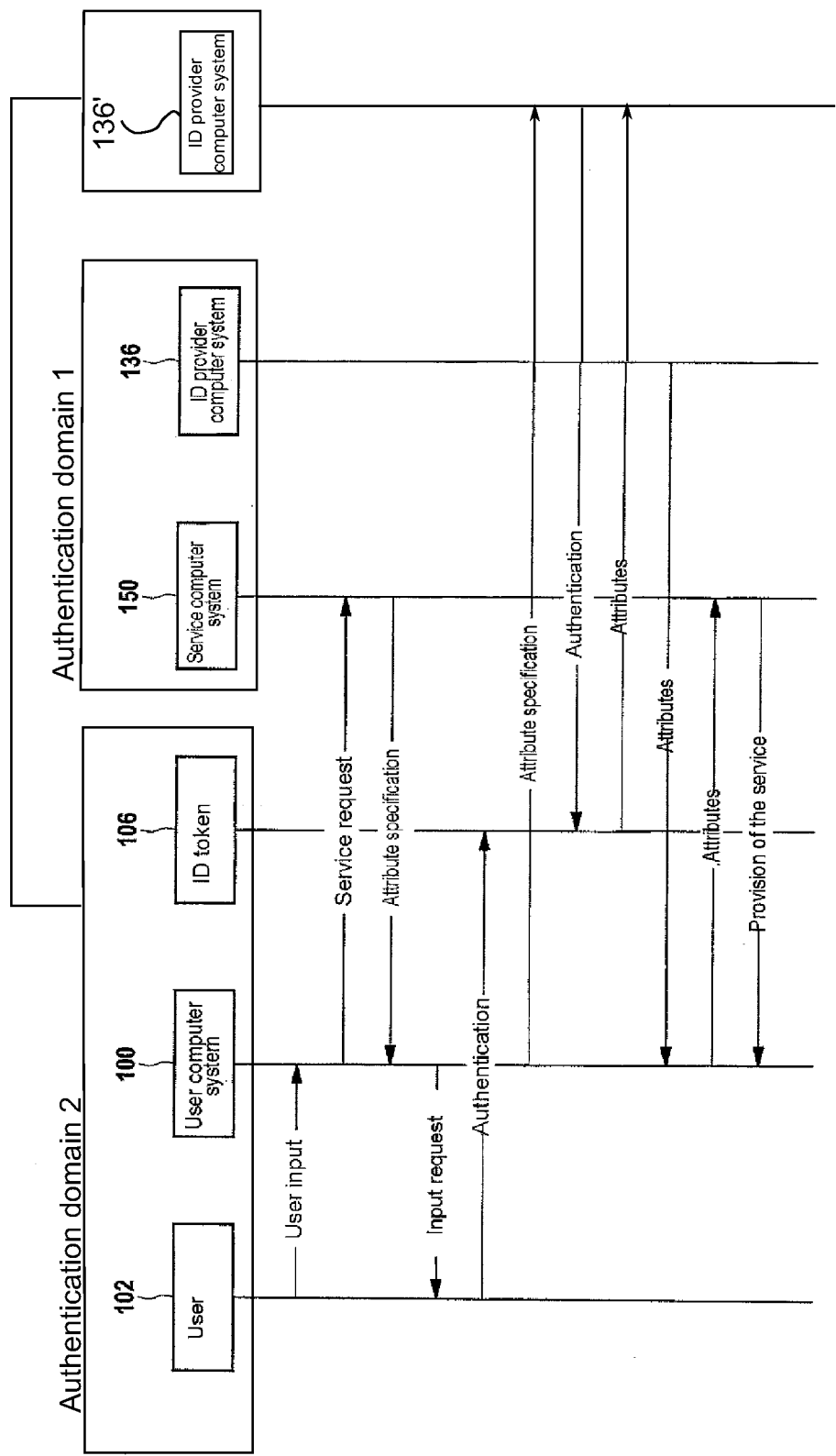
FIG. 4 shows a UML diagram of a further embodiment of a method according to the invention.

FIG. 4 shows a further embodiment of a method according to the invention. The method involves acknowledgement domains 1 and 2, wherein the acknowledgement domain 1 comprises the service computer system 150 and the ID provider computer systems of the first set, to which the ID provider computer system 136 belongs, and wherein the acknowledgement domain 2 comprises the ID token 106 of user 102, the user computer system 100 and the ID provider computer systems of the second set, to which the ID provider computer system 136' belongs. According to the embodiment considered herein the ID provider computer system 136' does not belong to the first set.

A user input from a user 102 into a user computer system 100 is used by the user 102 to specify a service on a service computer system which he or she wishes to use. By way of example, this is done by calling an Internet page on the service computer system and selecting one of the services provided thereon. The service request from the user 102 is transmitted from the user computer system 100 to the service computer system 150.

The service computer system 150 responds to the service request with an attribute specification, i.e. for example a list of attribute names. The attribute specification can be sent in form of the soft token. In addition to the attribute specification the soft token can comprise a designation of an ID provider computer system of the first set. According to the embodiment considered herein this is the ID provider computer system 136. When the attribute specification has been received, the user computer system 100 asks the user 102 to authenticate himself to the ID token 106, for example by means of an input request.

The user 102 then authenticates himself to the ID token 106, for example by inputting his PIN. Further the user computer system 100 determines which ID provider computer system has reading rights for reading the specified attributes from the ID token 106. This can be performed by using configuration datasets, by a query to the ID token 106 or by a query to a directory server. According to the embodiment considered herein it is the ID provider computer system 136.

Following successful authentication, the soft token is forwarded from the user computer system 100 to the ID provider computer system 136, wherein an identifier of the ID provider computer system 136' has been added to the soft token. The soft token is forwarded by the ID provider computer system 136 to the ID provider computer system 136'. The latter then authenticates itself to the ID token 106 and sends a read request for reading the attributes according to the attribute specification to the ID token 106.

Assuming the prior successful authentication of the user 102 and of the ID provider computer system 136, the ID token 106 responds to the read request with the desired attributes.

The ID provider computer system 136 signs the attributes and sends the signed attributes to the user computer system 100. Following release by the user 102, the signed attributes are then transmitted to the service computer system 150, which can then provide the desired service as appropriate.

This has in particular the advantage that electronic legal relations crossing acknowledgement domains can be performed in an efficient and secure manner.

LIST OF REFERENCE SYMBOLS

100 User computer system
102 User
104 Interface
106 ID token
106' ID token
108 Interface
110 Processor
112 Program instructions
114 Network interface
116 Network
118 Electronic memory
120 Protected memory area
122 Protected memory area
124 Protected memory area
126 Memory area
128 Processor
130 Program instructions
132 Program instructions
134 Program instructions
136 ID provider computer system
136' ID provider computer system
138 Network interface
140 Memory
142 Private key
144 Certificate
145 Processor
146 Program instructions
148 Program instructions
149 Program instructions
150 Service computer system
152 Network interface
154 Processor
156 Program instructions
158 Configuration data record
160 Configuration data record
161 Configuration data record
162 User input
164 Service request
166 Attribute specification
168 Request
168' Request
170 Response

The invention claimed is:

1. A method for reading at least one attribute stored in an ID token, wherein the ID token is associated with a user, having the following steps:
sending a user request from a computer of the user (a fourth computer system) to a second computer system indicating that the user seeks to obtain goods and/or services from the second computer system,
producing an attribute specification that specifies at least one attribute contained in the ID token and specifies a third computer system, by the second computer system in response to the user request, and transmitting the attribute specification from the second computer system to the fourth computer system, facilitating authentication of the user to the ID token via the fourth computer system in response to the fourth computer system receiving the attribute specification, producing a modified attribute specification by the fourth computer system that specifies the at least one attribute and specifies a first computer system remote from the fourth computer system, in response to successful authentication of the user to the ID token, and transmitting the modified attribute specification to the third computer system specified by the attribute specification, authenticating the first computer system to the ID token in response to receiving the modified attribute specification from the third computer system, transmitting a read request from the first computer system to the ID token and receiving the at least one attribute stored in the ID token, signing the at least one attribute, and transmitting the signed at least one attribute to the fourth computer system, and adding further data to the at least one attribute by the user prior to the fourth computer system transmitting the signed attributes from the fourth computer system upon release by the user to the third computer system.

2. The method as claimed in claim 1, wherein the first computer system is authenticated to the ID token using a certificate of the first computer system, wherein the certificate contains an indication of those attributes stored in the ID token for which the first computer system is authorized for the read access.

3. The method as claimed in claim 2, wherein the ID token checks the read authorization of the first computer system for the read access to at least one of the attributes using the certificate.

4. The method as claimed in claim 1, having the following further steps:
the at least one attribute read from the ID token is signed by the first computer system,
the signed attribute is transmitted from the first computer system to the second computer system.

5. The method as claimed in claim 1, wherein the fourth computer system has a plurality of predefined configuration data records, wherein each of the configuration data records specifies a subset of the attributes, at least one data source and the first computer system from a set of available first computer systems, the fourth computer system selecting at least one of the configuration data records which specifies a subset of the attributes which contains the at least one attribute specified in the attribute specification.

6. The method as claimed in claim 1, wherein the first computer system has a plurality of certificates with different read rights, wherein the first computer system takes the receipt of the attribute specification as a basis for selecting at least one of the certificates which has the read rights which are sufficient for reading the at least one attribute specified in the attribute specification.

7. The method as claimed in claim 1, wherein the fourth computer system has at least one configuration data record which specifies an external data source for requesting a further attribute from the third computer system via the network.

8. The method as claimed in claim 7, wherein the further attribute is requested after the at least one attribute has been read from the ID token, and after the fourth computer system has received the signed at least one attribute from the first computer system, wherein the request contains the signed at least one attribute.

9. The method as claimed in claim 1, wherein a condition for providing the goods and/or service is the reception of the at least one attribute by the second computer system, wherein the attribute specification is forwarded from the fourth computer system to the third computer system in form of a request, which comprises a designation of the first computer system.

10. A computer system, comprising: a goods and/or service provider computer system including a memory storing instructions for execution by a processor and causing the processor to:
receive a user request from a user's computer system indicating that the user seeks to obtain goods and/or services, whereby the user controls an ID token containing a plurality of attributes,
produce an attribute specification that specifies at least one attribute contained in the ID token and specifies an intermediary computer system, in response to the user request, and transmitting the attribute specification to the user's computer system, wherein:
the user authenticates himself to the ID token via the user's computer system in response to the user's computer system receiving the attribute specification,
the user's computer system: (i) produces a modified attribute specification that specifies the at least one attribute and specifies a further intermediate computer system remote from the user's computer system, in response to successful authentication of the user to the ID token, and (ii) transmits the modified attribute specification to the further intermediate computer system specified by the attribute specification,
the further intermediate computer system authenticates to the ID token in response to receiving the modified attribute specification from the intermediary computer system,
the further intermediate computer system transmits a read request to the ID token and receives the at least one attribute stored in the ID token, signs the at least one attribute, and transmits the signed at least one attribute to the user's computer system, and
wherein further data are added to the at least one attribute prior to the user's computer system transmitting the signed attributes upon release by the user to the further intermediate computer system.

11. The computer system as claimed in claim 10, wherein the further intermediate computer system includes means for generating a request to the user for authentication to the ID token on the basis of the receipt of the attribute specification.

12. The computer system as claimed in claim 10, wherein the further intermediate computer system includes means for signing the at least one attribute, wherein the signed attribute is sent.

13. The computer system as claimed in claim 10, further comprising a plurality of the certificates, wherein the certificates define different read rights, wherein the computer system is designed to take the receipt of the attribute specification as a basis for selecting at least one of the certificates which has the read rights which are sufficient for reading the attributes specified in the attribute specification.

* * * * *